(12) United States Patent
Saito

(10) Patent No.: US 10,843,660 B2
(45) Date of Patent: Nov. 24, 2020

(54) PORTABLE DEVICE

(71) Applicant: DENSO CORPORATION, Kariya (JP)

(72) Inventor: Toshiaki Saito, Kariya (JP)

(73) Assignee: DENSO CORPORATION, Kariya (JP)

(*) Notice: Subject to any disclaimer, the term of this patent is extended or adjusted under 35 U.S.C. 154(b) by 169 days.

(21) Appl. No.: 16/307,101

(22) PCT Filed: May 9, 2017

(86) PCT No.: PCT/JP2017/017507
§ 371 (c)(1),
(2) Date: Dec. 4, 2018

(87) PCT Pub. No.: WO2017/212847
PCT Pub. Date: Dec. 14, 2017

(65) Prior Publication Data
US 2019/0225187 A1 Jul. 25, 2019

(30) Foreign Application Priority Data
Jun. 7, 2016 (JP) ................. 2016-113857

(51) Int. Cl.
B60R 25/24 (2013.01)
E05B 19/00 (2006.01)
E05B 49/00 (2006.01)

(52) U.S. Cl.
CPC .............. B60R 25/24 (2013.01); E05B 19/00 (2013.01); E05B 19/0052 (2013.01); E05B 49/00 (2013.01)

(58) Field of Classification Search
CPC ..... B60R 25/24; E05B 19/00; E05B 19/0052; E05B 49/00; E05B 19/0082; E05B 49/004; G07C 2009/00952; G07C 9/00944

USPC ..... 70/257, 408, 456 R, 459; 206/37.1–37.8, 206/38.1
See application file for complete search history.

(56) References Cited

U.S. PATENT DOCUMENTS

| 6,216,501 | B1* | 4/2001 | Marquardt | ............. | A45C 11/32 70/252 |
| 6,460,696 | B1* | 10/2002 | Meyer | ...................... | A45C 1/02 206/37.1 |
| 7,596,977 | B2* | 10/2009 | Eychenne | ............ | A45C 11/325 206/37.4 |
| 9,959,688 | B2* | 5/2018 | Saito | .................. | G07C 9/00944 |

(Continued)

FOREIGN PATENT DOCUMENTS

| DE | 202005004994 U1 | 5/2005 |
| DE | 102010014207 A1 | 12/2011 |

(Continued)

Primary Examiner — Lloyd A Gall
(74) Attorney, Agent, or Firm — Harness, Dickey & Pierce, P.L.C.

(57) ABSTRACT

A portable device executes wireless communication with an in-vehicle device in a vehicle to thereby permit the in-vehicle device to perform control relating to locking or unlocking of a door in the vehicle. The portable device includes a circuit board on which a function for executing control is mounted, a housing, and a side cover. The housing is achieved by combining an upper case and a lower case configured to separate in an up and down direction that is a direction orthogonal to the circuit board. The side cover is attached to a side surface on an outside of the housing to bring the upper case and the lower case into close contact with each other.

4 Claims, 6 Drawing Sheets

(56) References Cited

U.S. PATENT DOCUMENTS

| | | | |
|---|---|---|---|
| 2004/0149605 A1* | 8/2004 | Ohtaki | H04B 1/0346 |
| | | | 206/320 |
| 2005/0136852 A1* | 6/2005 | Nakagawa | H04B 1/034 |
| | | | 455/90.3 |
| 2007/0227866 A1* | 10/2007 | Dimig | E05B 19/0082 |
| | | | 200/302.2 |
| 2015/0204108 A1* | 7/2015 | Ghabra | G07C 9/00944 |
| | | | 70/456 R |
| 2016/0267728 A1 | 9/2016 | Saito | |
| 2018/0302788 A1* | 10/2018 | Konchan | H04M 1/21 |

FOREIGN PATENT DOCUMENTS

| | | |
|---|---|---|
| DE | 102012107950 A1 | 3/2014 |
| JP | 2008008032 A | 1/2008 |
| JP | 2008266893 A | 11/2008 |
| JP | 2015086570 A | 5/2015 |
| JP | 2015229842 A | 12/2015 |

\* cited by examiner

PORTABLE DEVICE

CROSS REFERENCE TO RELATED APPLICATIONS

This application is a U.S. National Phase Application under 35 U.S.C. 371 of International Application No. PCT/JP2017/017507 filed on May 9, 2017. This application is based on and claims the benefit of priority from Japanese Patent Application No. 2016-113857 filed on Jun. 7, 2016. The entire disclosures of all of the above applications are incorporated herein by reference.

TECHNICAL FIELD

The present disclosure relates to a portable device that executes wireless communication with an in-vehicle device in a vehicle to thereby allow the in-vehicle device to perform control relating to locking and unlocking of a door in the vehicle.

BACKGROUND ART

As disclosed in Patent literature 1, there is conventionally known a vehicle electronic key system, which executes a predetermined control such as locking and unlocking of a door in a vehicle with a device mounted on the vehicle (hereinafter referred to as an in-vehicle device) performing wireless communication with a portable device held by a user.

A portable device used in such a vehicle electronic key system is configured to accommodate (i) a circuit board where various electronic components are mounted and (ii) a battery, in a housing formed by an upper case and a lower case. The upper case and the lower case are configured to form a fitting structure using a fitting claw or the like so as to be separated or fitted in an up and down direction. This up and down direction signifies a direction orthogonal to the circuit board.

PRIOR ART LITERATURE

Patent Literature

Patent literature 1: JP 2015-086570 A

SUMMARY OF INVENTION

The portable device carried by the user is required to satisfy a predetermined basic performance such as a falling-proof performance. In order to realize such a predetermined falling-proof performance, the fitting claw itself needs to have a predetermined size or more. In addition, the member supporting the fitting claw is also required to have a predetermined strength or more. This is because the smaller the fitting claw locking the upper case and the lower case is, the easier the upper case and the lower case are separated.

As a result, the presence of the fitting claw has been a constraint in realizing miniaturization of the case or diversification of the case shape. Naturally, when variations in the shape or size of the case are restricted, a portable device is also restricted in design variations.

It is an object of the present disclosure to provide a portable device having a structure to which more various designs can be applied.

According to an aspect of the present disclosure to achieve the above object, a portable device performs wireless communication with an in-vehicle device provided in a vehicle to at least enable the in-vehicle device to perform a control relating to locking or unlocking of a door in the vehicle. The portable device is provided to include a circuit board, a housing, and a side cover. The circuit board includes a function that executes control. The housing is achieved by combining an upper case and a lower case, which are configured to separate from each other in an up and down direction which is orthogonal to the circuit board. The side cover is attached to a side surface on an outside of the housing and brings the upper case and the lower case into close contact with each other.

According to the above configuration, the movement in the direction in which the upper case and the lower case are separated (i.e., the up and down direction) is restricted by the side cover. That is, the side cover reinforces the falling-proof performance of the housing.

The above configuration can thus alleviate the restriction such as a strength required for the fitting claw to lock the upper case to the lower case, as compared with a configuration not provided with a side cover (hereinafter referred to as a conventional configuration) as disclosed in Patent literature 1. In addition, the above configuration can also alleviate the restriction on the strength of the member that supports the fitting claw. Furthermore, the fitting state of the upper case and the lower case is maintained by the side cover; this may eliminate the need of providing a fitting claw depending on the strength of the side cover.

That is, the above configuration alleviates structural restrictions such as the size or strength required for the fitting claw itself and the member adjacent to the fitting claw, thereby reducing the size of the fitting claw, reducing the wall thickness of the case, or omitting the fitting claw itself, as compared with the conventional configuration. As a result, the size of the housing can be reduced to enable the portable device to adopt various designs.

Further, changing the shape or the material of the side cover enables the design variations to be enriched. That is, the side cover itself contributes to the diversification of the design of the portable device. Therefore, more various designs can be applied to the portable device having the above structure.

In addition, a part or the whole of a portion where the upper case and the lower case are joined (hereinafter referred to as a case joining portion) is covered with the side cover; this can suppress the amount of the case joining portion that is exposed to an exterior. As a result, even in the case where a texture pattern is formed as a design on the side surfaces of the upper case and the lower case, the concern about the uniformity in the design of the case joining portion is also reduced.

Further, in order to prevent a step from appearing at the case joining portion, a relatively severe shape quality has been conventionally required for the upper case and the lower case. The above configuration however covers at least a part of the case joining portion by using the side cover; the step appearing at the case joining portion is suppressed from giving a user with a feeling of discomfort. The criteria in the shape quality of each case member can thereby be relaxed.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

An embodiment of the present disclosure will be described with reference to the drawings. The present embodiment is provided with a portable device 1, which is used in a known vehicle electronic key system. The vehicle electronic key system controls a locked state of a door in the vehicle by performing wireless communication between (i) a portable device carried by a user and (ii) an in-vehicle device mounted to the vehicle. The vehicle electronic key system includes a keyless entry system or a smart entry system.

The keyless entry system is a system where the portable device 1 transmits a wireless signal corresponding to a switch pressed by a user while the in-vehicle device executes a process corresponding to the wireless signal (for example, unlocking or locking of a door). Further, the smart entry system is a system where a portable device returns a response signal to a response request signal transmitted from an in-vehicle device to thereby permit the in-vehicle device to execute a predetermined process.

Each system in the above permits the portable device 1 to function as a key of a vehicle associated with the portable device 1 itself. The portable device 1 according to the present embodiment includes a main body portion having components for performing wireless communication with the in-vehicle device, a side cover attached to a side surface of the main body portion, and an emergency key for mechanically achieving locking and unlocking of a door in the vehicle by being inserted into a keyhole provided in the door.

Figure 1:
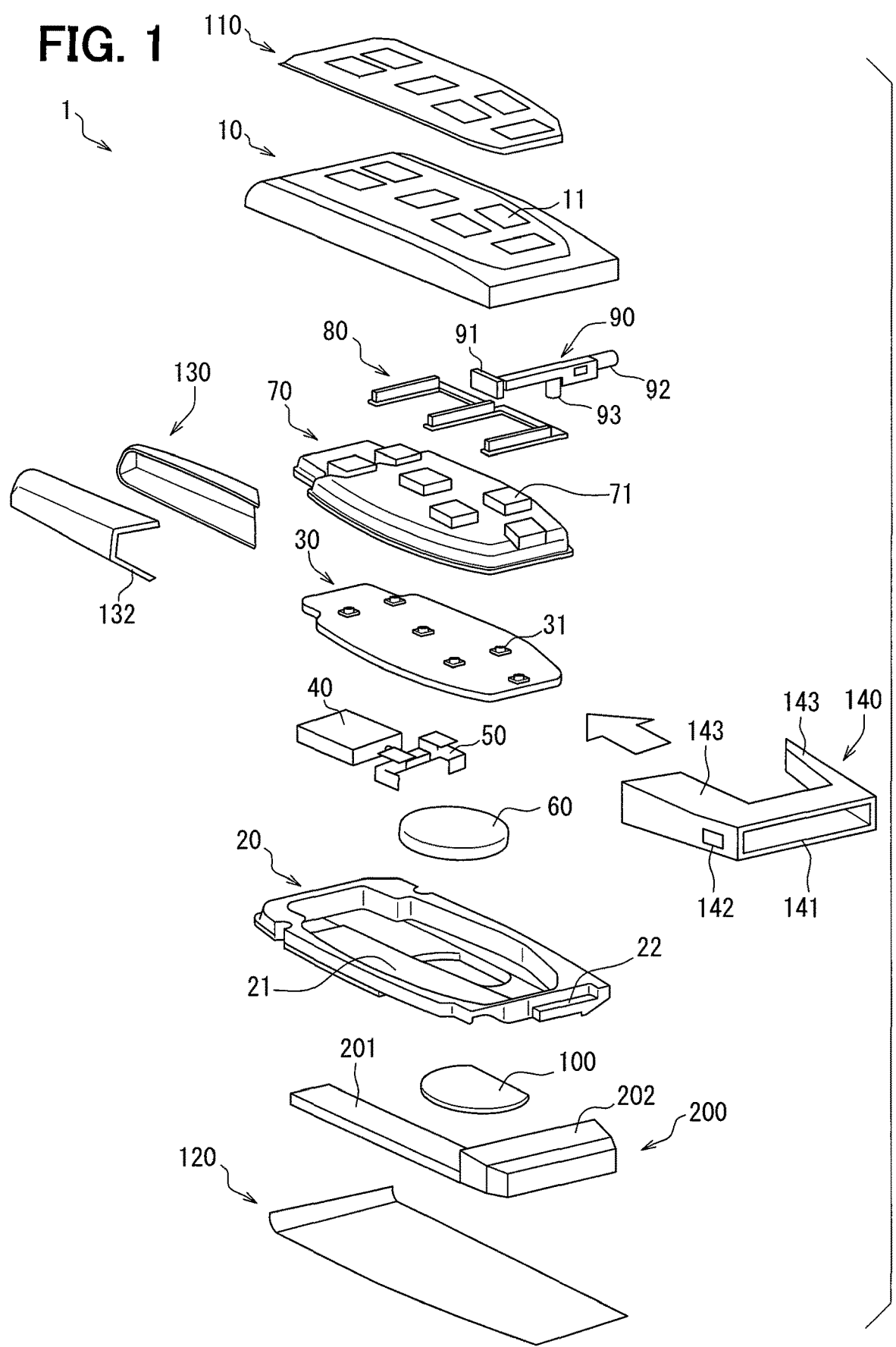
FIG. 1 is an example of an exploded perspective view illustrating a configuration of a portable device 1 according to the present embodiment.

As illustrated in FIG. 1, the portable device 1 includes an upper case 10, a lower case 20, a circuit board 30, an antenna 40, a terminal 50, a battery 60, an elastic cover 70, a separator 80, a release button 90, a battery cover 100, a top plate 110, a bottom plate 120, a side band 130, a side cap 140, and an emergency key 200.

Figure 2:
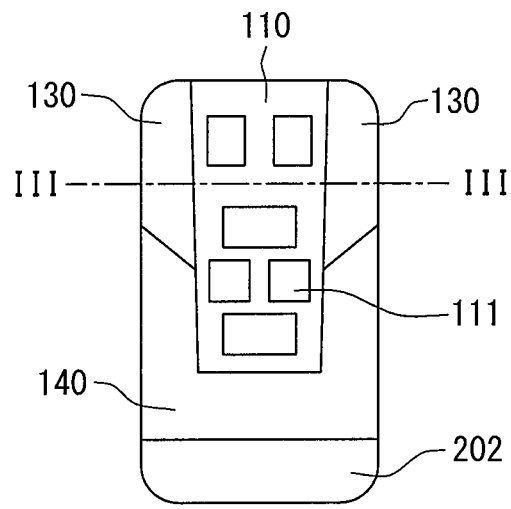
FIG. 2 is a plan view of a portable device.

The above members are combined to thereby configure the portable device 1 to be shaped of a substantially rectangular parallelepiped with a flattened form and rounded corner portions as a whole. FIG. 2 is a diagram schematically illustrating a shape of the portable device 1 in plan view. In the plan view, the portable device 1 appears as a rectangle having long sides and short sides with corner portions rounded (hereinafter referred to as a corner rounded rectangle). Note that a rectangle having long sides and short sides is equivalent to a rectangle excluding a square.

The main body portion is a structure which combines, in sequence in the up and down direction, the upper case 10, the lower case 20, the circuit board 30, the antenna 40, the terminal 50, the battery 60, the elastic cover 70, the separator 80, the release button 90, the battery cover 100, the top plate 110, and the bottom plate 120.

The direction orthogonal to the circuit board 30 is referred to as an up and down direction, hereinafter, for the sake of convenience. The direction from the circuit board 30 to the lower case 20 is a downward direction; the direction from the circuit board 30 to the upper case 10 is an upward direction. Further, the direction parallel to the long side of the main body portion is referred to as a long side direction, and the direction parallel to the short side is referred to as a short side direction.

The side cover includes the side bands 130 and the side cap 140. As illustrated in FIG. 2, the side bands 130 are attached to both side surfaces in the long side direction of the main body portion so as to sandwich the main body portion between both the ends in the short side direction of the main body portion. That is, the side band 130 is attached to each of a pair of side surfaces (hereinafter referred to as long side surfaces) extending in the long side direction among the side surfaces of the main body portion. In other words, the two side bands 130 are attached, respectively, to two long side surfaces extending in the long side direction.

The side cap 140 is a cylindrical member attached to one end portion of the main body portion in the long side direction. Each of the side band 130 and the side cap 140 is a member which sandwiches, in the up and down direction, the upper case 10 and the lower case 20 so as to be in close contact with each other. That is, the side bands 130 and the side cap 140 act to suppress the upper case 10 and the lower case 20 from separating from each other in the up and down direction.

The side bands 130 and the side cap 140 together with the top plate 110 and the bottom plate 120 function as members providing an exterior appearance design of the portable device 1. The emergency key 200 includes (i) a key plate portion 201 that is to be inserted into a key hole of a door of the vehicle and (ii) a key grip portion 202 provided at an end portion of the key plate portion 201.

The upper case 10 and the lower case 20 are formed as two divided members into which a thin rectangular parallelepiped having internal hollow space is divided along a plane perpendicular to the thickness direction (in other words, the up and down direction). The upper case 10 and the lower case 20 are configured to be fitted to each other in a state of being overlapped with each other in the thickness direction. The structure for fitting the upper case 10 and the lower case 20 to each other may employ a well-known fitting structure such as a hook-type snap fit or the like. Note that the hook-type snap fit indicates a fixing technique which hangs mechanically a hook provided on a part of one of the upper case 10 and the lower case 20 on a locking portion (for example, a concave portion or a through hole) provided on the other one as a receiving end.

For example, a hook is provided at a predetermined position of the upper case 10; a locking portion provided at a predetermined position of the lower case 20. Hanging the hook on the locking portion may permit the upper case 10 to be locked with the lower case 20. Needless to say, the hook and the locking portion are provided to be arranged at positions opposing to each other (in other words, the positions overlapping in plan view). For the sake of convenience, a member produced by fitting the upper case 10 and the lower case 20 to each other is referred to as a fitting housing. The fitting housing is equivalent to a housing. The shape of the fitting housing provides a schematic shape of the main body portion.

The portion where the upper case 10 and the lower case 20 are joined (hereinafter referred to as a case joining portion) is provided with a rubber O-ring. The O-ring may be provided on the upper case 10 or may be provided on the lower case 20. The O-ring is compressed by the fitting force of the upper case 10 and the lower case 20 to thereby provide functions of a waterproof and a dustproof.

The internal space of the fitting housing formed by integrating the upper case 10 and the lower case 20 accommodates the circuit board 30, the elastic cover 70, the separator 80, the release button 90, the antenna 40, the terminal 50, and the battery 60. Specifically, the battery 60 is disposed between the lower case 20 and the circuit board 30. The antenna 40 and the terminal 50 are mounted on the lower surface of the circuit board 30.

The elastic cover 70 is disposed over the circuit board 30 so as to cover the upper surface of the circuit board 30. The separator 80 is disposed between the elastic cover 70 and the upper case 10. Note that the release button 90 is attached to a release button accommodating portion 22 provided on the side surface of the lower case 20.

The above upper case 10 may be realized by using a predetermined material such as silicone rubber. The upper case 10 is assumed to be realized by using silicon rubber, as an example. The upper surface of the upper case 10 is provided with a plurality of pushing force transmission portions 11. The plurality of pushing force transmission portions 11 are provided at positions overlapping with switch elements 31 provided on the circuit board 30 in plan view. Each of the pushing force transmission portions 11 is configured to move in the up and down direction as a user pushes down.

The side surface and the upper surface of the upper case 10 are provided with concave portions, convex portions, and the like for defining attachment positions of members such as the top plate 110, the side bands 130, and the side cap 140. That is, the outer surface of the upper case 10 is formed to match the shapes of the inner surfaces of the top plate 110, the side bands 130, and the side cap 140.

The concave portions and the convex portions for positioning the top plate 110, the side bands 130, and the side cap 140 may function as members for fitting and integrating these members to the fitting housing. Each of the inner surfaces of the top plate 110, the side band 130, and the side cap 140 refers to a surface that is not visible from the outside under a state of being completely assembled as the portable device 1. The upper case 10 is formed so as to expose an operation surface 91 and a locking portion 93 of the release button 90.

The lower case 20 is realized by using a resin material that provides strength required as design items as appropriate, such as polycarbonate (PC) resin, polycarbonate ABS resin, or the like. The polycarbonate ABS resin is a resin obtained by mixing PC resin and ABS resin. The ABS resin is a copolymerized synthetic resin of acrylonitrile, butadiene and styrene.

The inner surface of the lower case 20 is provided with convex portions and the concave portions having functions of supporting and positioning the circuit board 30 and the battery 60. The bottom of the lower case 20 is provided with an opening portion into which the battery cover 100 is inserted.

Further, the bottom of the lower case 20 is provided with a key accommodating portion 21 for accommodating the emergency key 200. The key accommodating portion 21 is formed so as to mainly match the shape of the key plate portion 201. The side surfaces of the lower case 20 includes a specific one side surface where the key grip portion 202 is located when the key plate portion 201 is accommodated in a key accommodating portion 21; the specific one side surface is provided with a release button accommodating portion 22 for supporting the release button 90.

The release button 90 is attached to the release button accommodating portion 22. In a state where the emergency key 200 is accommodated in the portable device 1, the key grip portion 202 comes into contact with the release button 90.

The outer surface of the lower case 20 is provided with concave portions and the convex portions, and the like for defining the attachment positions of the bottom plate 120, the side bands 130, and the side cap 140. That is, the outer surface of the lower case 20 is formed so as to match the shape of the inner surfaces of the bottom plate 120, the side bands 130, and the side cap 140.

The circuit board 30 appears in plan view to be shaped of a substantially rectangular plate; a plurality of switch elements 31 that are push button types are mounted on the upper surface of the circuit board 30. Further, the antenna 40 and the terminal 50 are mounted on the lower surface of the circuit board 30. The antenna 40 is an antenna element for performing wireless communication with the in-vehicle device. The terminal 50 is a terminal for connecting the battery 60 with the circuit board 30.

In addition, on the circuit board 30, electronic components for executing various controls are mounted. For example, on the circuit board 30, a demodulation circuit, a modulation circuit, a CPU, RAM, ROM, and the like for executing various arithmetic processing are mounted.

The elastic cover 70 is realized by using a material, which has elasticity and hardly absorbs moisture. For example, the elastic cover 70 may be realized using silicon or the like. The elastic cover 70 covers the upper surface of the circuit board 30 and is formed so as to be integrated with the lower case 20. As a result, the elastic cover 70 functions as a member that prevents the entry of the water or foreign matter from a portion, where the upper case 10 and the lower case 20 are joined together, into an inner side (in other words, the side closer to the circuit board 30) of the elastic cover 70.

Further, the upper surface of the elastic cover 70 is provided with a protruding step portion 71 having a stepped shape protruding upward at a position overlapping with the switch element 31. The protruding step portion 71 and the pushing force transmission portion 11 convey, to the switch element 31, a user's pressing operation onto the button portion 111 described later. Further, when the user is not pressing the button portion 111, the pushing force transmission portion 11 and the button portion 111 are restored to an original position due to the elastic force of the protruding step portion 71.

The separator 80 disposed on the upper surface of the elastic cover 70 is a member that suppresses the force applied by the user to a specific one of the pushing force transmission portions 11 from acting on the switch element 31 corresponding to the other pushing force transmission portions 11 excluding the specific one, for example. The separator 80 is arranged between the protruding step portions 71 (in other words, so as to partition the protruding step portions 71 from each other).

The release button 90 is a member which is formed in a substantially rod shape while functioning as an extraction button for extracting the emergency key 200 from the portable device 1. The release button 90 having one end and the other end is provided with (i) the operation surface 91 to be operated by the user at the one end and (ii) a spring 92 attached to the other end. The operation surface 91, which is to be operated by a user, is exposed to a region external to the operation surface opening portion 142 provided in the side cap 140.

Further, the release button 90 is provided with the locking portion 93 for maintaining the state of the emergency key 200 accommodated in the portable device 1. The user's depressing the operation surface 91 displaces the position of the locking portion 93 relative to the emergency key 200 so as to allow the user to take out the emergency key 200 from the portable device 1. The configuration including the release button 90 and the key accommodating portion 21 is equivalent to a key holding mechanism.

The spring 92, which is attached in a posture that expands and contracts in the longitudinal direction of the release button 90, plays a role of returning the release button 90 operated by the user to an original position. As will be described later, the side cap 140 is provided with an opening portion 141 through which the operation surface 91 is exposed to a region external to the side cap 140.

The battery cover 100 is a member for protecting the battery 60. For example, the battery cover 100 may be realized by using silicon or the like. The battery cover 100 is attached to a bottom portion of the lower case 20 so as to protect the lower surface of the battery 60.

The top plate 110 is a plate-like member attached to the upper surface of the upper case 10. The top plate 110 may be realized by using various plastic materials such as PA6, for example. Further, the top plate 110 may be realized by using an elastic member such as silicone rubber.

The top plate 110 may be attached to the upper case 10 by a locking mechanism (not shown) provided on the upper surface of the upper case 10. Another example may be provided in which the top plate 110 be fixed to the upper surface of the upper case 10 by being sandwiched between the side band 130 and the side cap 140. Further, the top plate 110 may be kept attached to the upper case 10 by an insertion slit provided in the key grip portion 202. The insertion slit is an opening into which one end of the top plate 110 is enabled to be inserted.

The top plate 110 provides an upper exterior appearance surface of the portable device 1. The top plate 110 is provided with a button portion 111 at a position overlapping with the pushing force transmission portion 11 in plan view. Note that the position overlapping with the pushing force transmission portion 11 is also equivalent to a position overlapping with the switch element 31 or the protruding step portion 71. Each of the button portions 111 is configured to move in the up and down direction as the user pushes down. The outer surface of the button portion 111 is provided to arrange graphics or character strings representing control contents that are to be executed by pressing the button portion 111.

Note that the button portion 111 may be an opening portion for exposing the pushing force transmission portion 11. This is because such a configuration also enables a user to press the switch element 31. Suppose a case where the button portion 111 be an opening portion for exposing the pushing force transmission portion 11. Such a case assumes that the surface of the pushing force transmission portion 11, instead of the surface of the button portion 111, be provided to arrange graphics or character strings representing control contents that are to be executed by pressing the graphics or character strings.

The bottom plate 120 is a plate-like member attached to a bottom surface of the lower case 20. The bottom plate 120 may use various plastic materials such as PA6, for example. The bottom plate 120 provides a lower exterior appearance surface of the portable device 1. The outer surface of the bottom plate 120 is provided with a predetermined decoration. Each of the top plate 110 and the bottom plate 120 is equivalent to a decorative plate. The top plate 110 and the bottom plate 120 will be collectively referred to as a plate member hereinafter, for the sake of convenience.

The bottom plate 120 may be attached to the lower case 20 by a locking mechanism (not shown) provided on the lower surface of the lower case 20. Another example may be provided in which the bottom plate 120 be fixed to the bottom surface of the lower case 20 by being sandwiched between the side band 130 and the side cap 140. Further, similar to the top plate 110, the bottom plate 120 may be kept attached to the lower case 20 by an insertion slit provided in the key grip portion 202.

Figure 3:
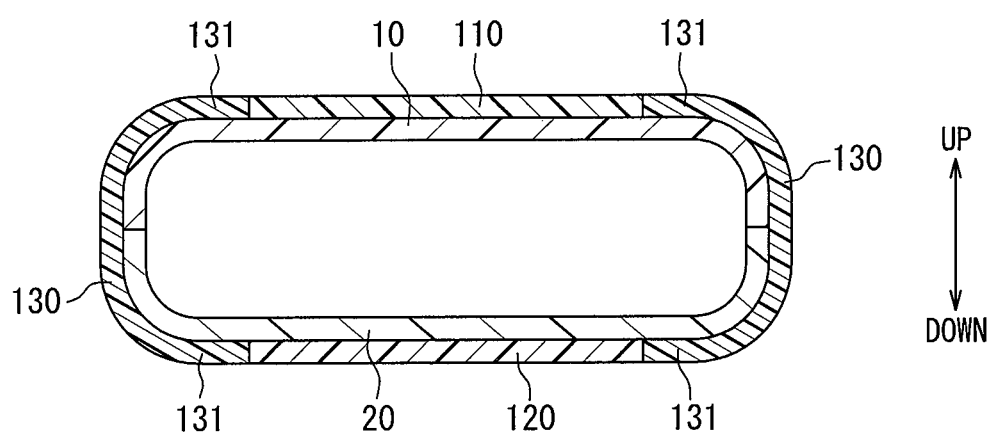
FIG. 3 is a cross-sectional view taken along the line III-III illustrated in FIG. 2.

As shown in FIG. 3, the side band 130 is formed in a substantially U-shape so as to sandwich the upper case 10 and the lower case 20. In FIG. 3, a portion indicated by reference numeral 131 represents a portion (hereinafter referred to as a horizontal contact portion) which is in contact with the upper case 10 or the lower case 20, respectively, from directly above or from directly below in FIG. 3. This configuration thereby functions to restrict the movement of the upper case 10 and the lower case 20 in the up and down direction.

The side band 130, which is attached to the fitting housing, functions as a member that covers the side surfaces of the lower case 20 and the upper case 10 while simultaneously sandwiching the upper case 10 and the lower case 20 so as not to separate in the up and down direction. FIG. 3 is a view for explaining the positional relationship between the side band 130, the upper case 10, the lower case 20, the top plate 110, and the bottom plate 120. In FIG. 3, the circuit board 30 and the like are not illustrated.

The side band 130 may be realized by using PC resin, ABS resin, or the like. In addition, the material of the side band 130 may be metal. The inner surface of the side band 130 (that is, the surface in contact with the fitting housing) is provided with a convex portion or a concave portion for preventing positional deviation in a state where the side band 130 is attached to the fitting housing.

The side cap 140 is a cylindrical member, which is slid in the direction of the white arrow in FIG. 1 and thus is attached to one end portion in the long side direction (in other words, the side surface) of the fitting housing. That is, the side cap 140 is configured to be detachable from the fitting housing by being slid in the long side direction.

The above one end portion to which the side cap 140 is attached is an end portion, where the key grip portion 202 is located in a state where the emergency key 200 is inserted in the main body portion. This end portion to which the side cap 140 is attached is equivalent to an attachment end portion.

The inner shape of the cylindrical side cap 140 is formed to match with the outer shape of the attachment end portion of the fitting housing. The side cap 140 attached to the attachment end portion therefore functions to bundle the upper case 10 and the lower case 20 together. That is, the side cap 140 restricts the up and down movement of the upper case 10 and the lower case 20.

The side cap 140 has an opening portion 141 through which the emergency key 200 is inserted. In addition, a side end in the short side direction of the side cap 140 is provided with an operation surface opening portion 142 for exposing the operation surface 91 of the release button 90.

Furthermore, the side cap 140 in the present embodiment includes a sub-band portion 143 formed so as to extend along the long side surface of the fitting housing. The sub-band portion 143 is formed in a substantially U-shape so as to sandwich the upper case 10 and the lower case 20, and provides the same function as the above side band 130. The sub-band portion 143 may be in contact with the end portion 132 of the side band 130 and play the role of locking the side band 130 to the fitting housing. The side cap 140 may be realized by using various plastic materials such as PA6, for example. Of course, the side cap 140 may be realized by using a metal.

The emergency key 200 is accommodated in the main body portion by the key accommodating portion 21 and the release button 90. Specifically, the key plate portion 201 is positioned inside the key accommodating portion 21 while the locking portion 93 of the release button 90 is caught by the concave portion provided in the key grip portion 202; the emergency key 200 is thus fixed to the main body portion.

The following describes an example of an assembling procedure of the above-described portable device 1. First, in a state in which the battery 60 is placed on the lower case 20, the circuit board 30 on which the antenna 40 and the terminal 50 are mounted is attached into the lower case 20. Next, the elastic cover 70 is attached to the lower case 20; the release button 90 is attached to the release button accommodating portion 22. Then, the separator 80 is disposed on the upper surface of the elastic cover 70, and the upper case 10 is fitted to the lower case 20.

The battery cover 100 is attached to the bottom surface of the fitting housing assembled in this manner, and the bottom plate 120 is then attached. Further, the top plate 110 is put on the upper case 10. Then, the side band 130 and the side cap 140 are attached to an assembled structure, which the above-described series of members are assembled to, from a direction orthogonal to the up and down direction. Finally, the emergency key 200 is inserted.

The side cap 140 is sandwiched between the fitting housing and the key grip portion 202; this eliminates the need of providing a coupling engagement for integration with the fitting housing. As a matter of course, a predetermined locking mechanism such as a snap fitting may be employed in order to further strengthen the fitting state with the fitting housing.

According to the above configuration, the movement in the direction separating the upper case 10 and the lower case 20 from each other is restricted by the side cover such as the side band 130 and the side cap 140. That is, the side cover reinforces the falling-proof performance of the fitting housing.

The above configuration can thus alleviate the restriction such as a strength required for the fitting claw to lock the upper case 10 to the lower case 20, as compared with a configuration not provided with any side cover (hereinafter referred to as a conventional configuration) as disclosed in Patent literature 1. In addition, the above configuration can also alleviate the restriction on the strength of the member peripheral to the fitting claw.

That is, the above configuration alleviates structural restrictions such as the size or strength required for each of the fitting claw itself and the member adjacent to the fitting claw, thereby reducing the size of the fitting claw, or reducing the wall thickness of case members such as the upper case 10, as compared with the conventional configuration. Furthermore, the fitting state between the upper case 10 and the lower case 20 is held by the side cover; thus, another configuration may be employed which does not include any fitting claw itself for locking the upper case 10 and the lower case 20 to each other. As a result, the size of the fitting housing can be reduced to allow various designs to be adopted; namely, the design variations can be diversified.

The above configuration permits the side cover to sandwich the upper case 10 and the lower case 20 from the outside; the compression rate of the waterproof rubber (specifically, the O-ring) is easily maintained at a constant value. As a result, durability deterioration can be reduced.

Further, the portion where the upper case 10 and the lower case 20 are joined (that is, the case joining portion) is covered by the side band 130 and the side cap 140; the amount of the case joining portion exposed to an exterior region can be thus reduced. This can reduce the necessity of caring about the step difference occurring at the case joining portion in respect of a design property.

Further, the portion exposing the case joining portion to an exterior region is limited to, in the side surface of the portable device 1, a portion that is not provided with any side cover. As a result, even in the case where a texture pattern is formed as a design on the side surfaces of the upper case 10 and the lower case 20, the necessity of caring about the uniformity in the design of the side faces is also reduced.

Furthermore, the release button 90 is covered with a cylindrical component (that is, the side cap 140); this complicates the disassembly, providing an effect of suppressing remodeling etc. of the circuit board 30. In addition, the circuit board 30 is covered with a plurality of members; this reduces the possibility that static electricity adversely affects the circuit board 30.

Further, the above embodiment employs a configuration which achieves the side cover by dividing the side cover into two kinds of parts of the side band 130 and the side cap 140. Such a configuration can attach the side band 130 to the fitting housing in a direction different from the direction in which the side cap 140 is attached to the fitting housing. This enables the adoption of a shape which needs an undercut as a side cover, thereby improving an exterior appearance and increasing the degree of freedom in design.

Although an embodiment of the present disclosure has been described above, the present disclosure is not limited to the above embodiment, and various modified examples described below are also included in the technical scope of the present disclosure. Furthermore, various modifications other than the following can be made without departing from the gist.

Further, members having the same functions as the members described in the above embodiment are denoted by the same reference numerals, and description thereof is omitted. Further, when only a partial configuration is described, the configuration of the above-described embodiment can be applied to the other portions.

First Modified Example

Figure 4:
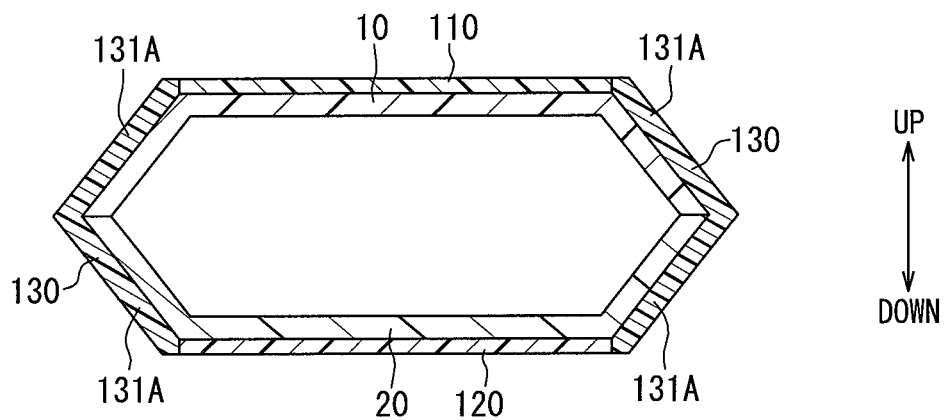
FIG. 4 is a diagram illustrating a modified example of the shape of a portable device.

The above embodiment describes, as an example, a configuration in which the side band 130 is formed so as to have a rounded U-shape as shown in FIG. 3. There is no need to be limited thereto. As shown in FIG. 4, when the fitting housing has a hexagonal cross section, the side band 130 may have a V-shaped cross-sectional shape according to the shape of the corresponding side surface of the fitting housing. In FIG. 4, a portion denoted by reference numeral 131A, which functions as an oblique contact portion 131A, restricts the movement of the upper case 10 or the lower case 20 in the up and down direction, similarly to the above horizontal contact portion 131 which extends in the horizontal direction and abuts on the upper case 10 or the lower case 20 from directly above or from directly below, respectively.

Figure 5:
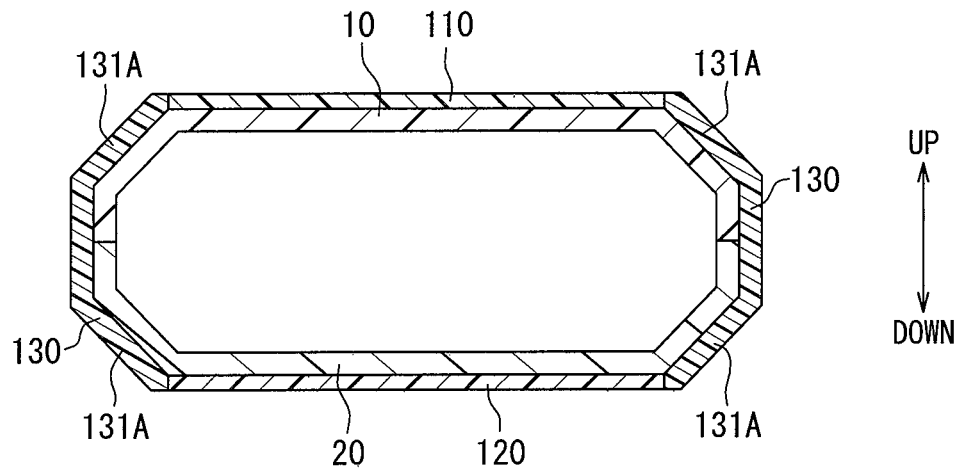
FIG. 5 is a diagram illustrating a modified example of the shape of a portable device.

In addition, as shown in FIG. 5, when the fitting housing has an octagonal cross-sectional shape, the side band 130 may have a shape that matches with the shape of the corresponding side surface of the fitting housing. That is, the cross-sectional shape of the side band 130 may conform to the shape of the side surface of the fitting housing. These various cross-sectional shapes are also equivalent to a U-shape. In other words, the U-shape is equivalent to a shape that sandwiches the upper case 10 and the lower case 20. Note that FIGS. 4 and 5 each illustrate a configuration in which the side band 130 does not include a horizontal contact portion 131; naturally, the horizontal contact portion 131 may be included.

Figure 6:
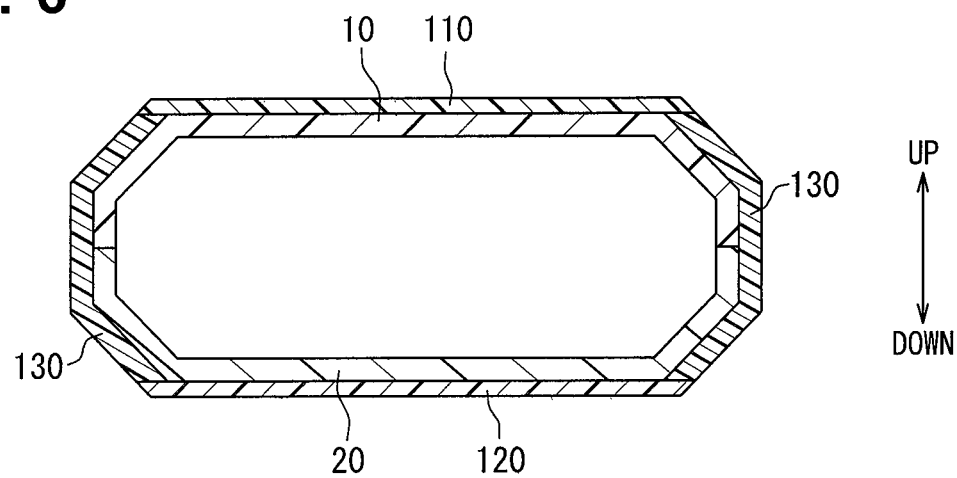
FIG. 6 is a diagram illustrating a modified example of the attachment structure of plate members.
Figure 7:
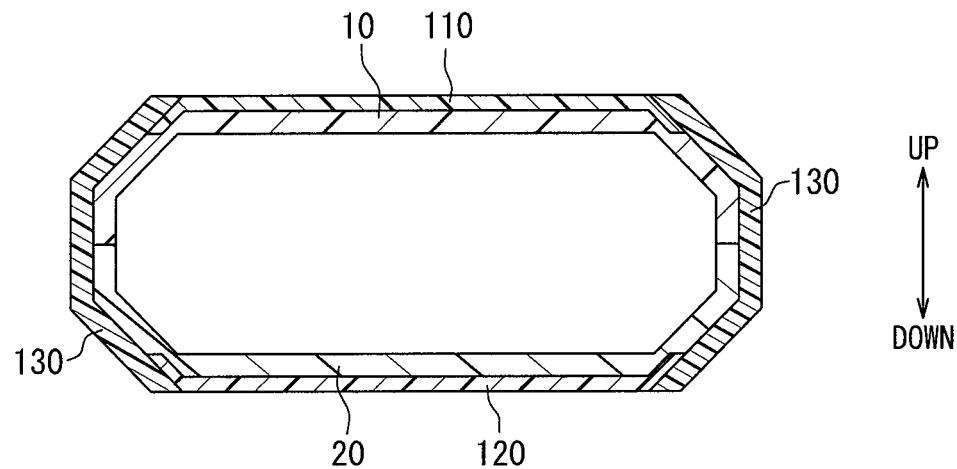
FIG. 7 is a diagram illustrating a modified example of the attachment structure of a plate member.

Further, as shown in FIG. 6, the top plate 110 may be attached so as to cover the side band 130 and the like from above. The same applies to the bottom plate 120. Further, as shown in FIG. 7, the side band 130 and the side cap 140 may be formed so as to sandwich the fitting housing via the plate members. In this case, the plate members are fixed to the fitting housing by using the side band 130 or the like.

Second Modified Example

Figure 8:
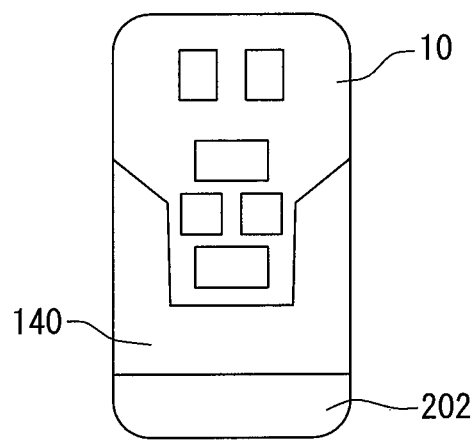
FIG. 8 is a diagram illustrating a modified example of the shape of a portable device.

The above embodiment describes a configuration including the side bands 130. There is no need to be limited thereto. That is, as shown in FIG. 8, it is not necessary to provide a side band 130.

Third Modified Example

Figure 9:
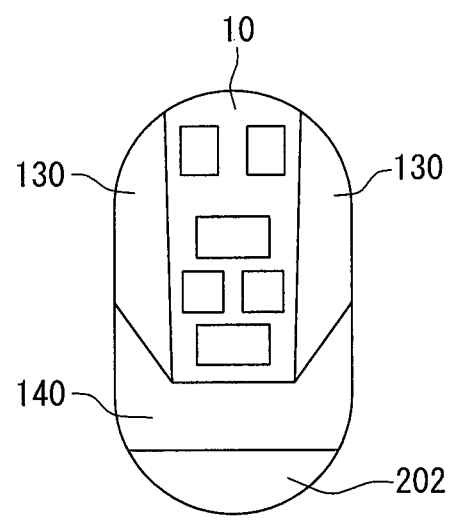
FIG. 9 is a diagram illustrating a modified example of the shape of a portable device.

The above embodiment describes, as an example, a configuration where the portable device 1 has an approximate shape relatively suppressing the rounded degree of the rounded corner portions of the rectangular parallelepiped. There is no need to be limited thereto. For example, as shown in FIG. 9, the end portion in the long side direction may be allowed to provide the rounded degree of the rounded corner portion to become semi-circular. Such a shape is included in a shape having the rounded corner portion of a rectangle in plan view.

Fourth Modified Example

A member (hereinafter referred to as common inner module) is defined as assembling the upper case 10, the lower case 20, the circuit board 30, the antenna 40, the terminal 50, the battery 60, the elastic cover 70, the separator 80, the release button 90, and the battery cover 100. Such a common inner module may be provided to design the upper case 10, the lower case 20, and the elastic cover 70 so as to satisfy predetermined basic performances such as falling-proof performance and waterproof performance.

Generally, if any one of various elements constituting an industrial design such as an exterior appearance shape or a material of the decorative member is different, how an impact acts at the time of falling, the waterproofness and the like change. This requires the confirmation of each basic performance for each design variant, consuming the designing man-hours.

In response to such an issue, the configuration described in a fourth modified example, which guarantees the basic performance of the common inner module, can omit a test for ascertaining whether or not the portable device 1 satisfies the basic performance as a whole in conjunction with changes in the material or surface treatment relative to the top plate 110, the bottom plate 120, the side band 130, or the side cap 140. In other words, the common inner module can be diverted as a common part of the portable device 1 providing various designs. That is, the configuration of the fourth modified example can suppress the development cost accompanying the expansion of the design variation as compared with the conventional configuration.

Further, the configuration of the fourth modified example allows the side cover or the plate members to function as a part that provides the degree of freedom of design of the portable device 1 and reinforces falling-proof performance, waterproof performance, and the like. Furthermore, the fourth modified example allows the user to change the exterior appearance of the portable device 1 only by changing the side cover. This can enhance the attractiveness (i.e., merchantability) as a product in respect of allowing the user to customize the exterior appearance of the portable device 1 to their own preference.

Note that the upper case 10 and the lower case 20 designed to satisfy a predetermined basic performance (for example, falling-proof performance and waterproof performance) in the fitting housing are equivalent to an upper case and a lower case in the conventional configuration.

Fifth Modified Example

Figure 10:
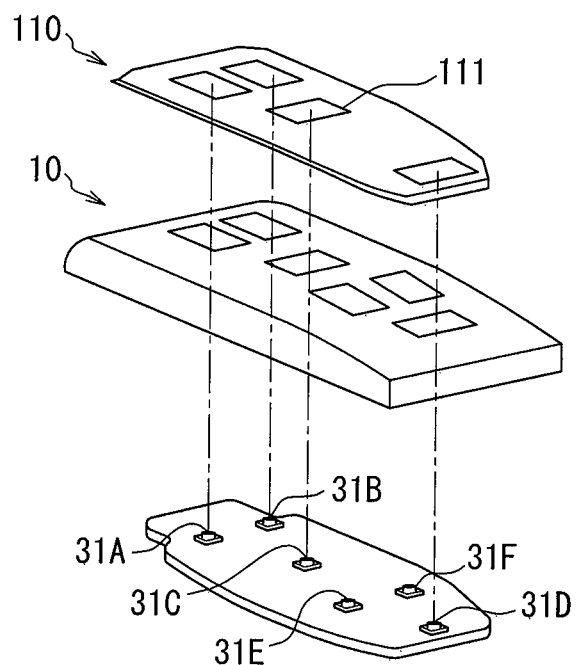
FIG. 10 is a view illustrating a modified example of the arrangement of button portions on a top plate.
Figure 11:
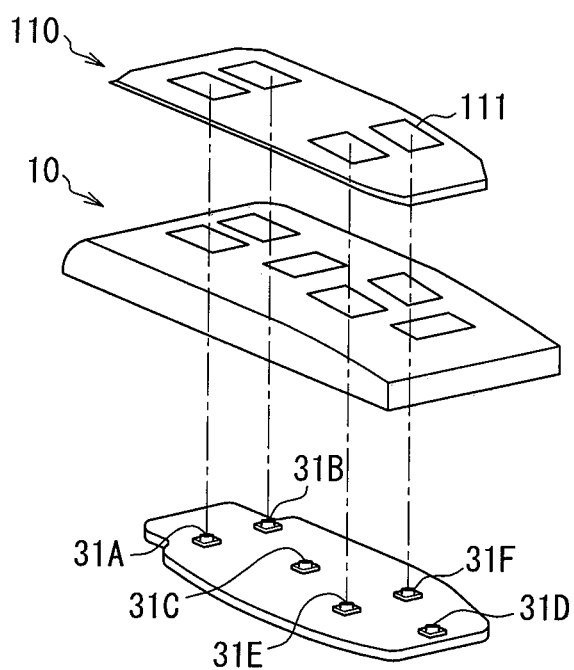
FIG. 11 is a view illustrating a modified example of the arrangement of button portions on a top plate.

In FIG. 1, a configuration is disclosed which arranges the button portions 111 at the positions corresponding to all the switch elements 31 in the top plate 110. There is no need to be limited thereto. As shown in FIG. 10 and FIG. 11, the top plate 110 may be formed such that a switch element 31 not including a button portion 111 is present among the switch elements 31A to 31F.

Note that, for instance, FIG. 10 illustrates a configuration forming the top plate 110 in which the button portions 111 are provided at positions corresponding to the switch elements 31A, 31B, 31C, 31D whereas any button portion 111 is not provided at each of the positions corresponding to the switch elements 31E and 31F. In contrast, for instance, FIG. 11 illustrates a configuration forming the top plate 110 in which the button portions 111 are provided at positions corresponding to the switch elements 31A, 31B, 31E, 31F whereas any button portion 111 is not provided at each of the positions corresponding to the switch elements 31C and 31D.

Applying such idea enables one kind of a common internal module to be diverted to each of a plurality of types of portable devices 1 providing different functions available to users, specifically as follows.

First, the common internal module arranges a plurality of switch mechanisms so as to match with any one of a plurality of types of button arrangement variations. The switch mechanism here signifies a switch element 31, a protruding step portion 71, and a pushing force transmission portion 11. The top plate 110 of the portable device 1 for a certain vehicle model includes only a button portion 111 corresponding to a switch mechanism used in the vehicle model among the plurality of switch mechanisms provided in the common inner module.

Such a configuration merely replaces the top plate 110, to thereby divert one common inner module to the portable devices 1 of various vehicle models. More specifically, by merely replacing the top plate 110 shown in FIG. 10 with the top plate 110 shown in FIG. 11, the combination of functions usable by the user via the portable device 1 can be changed from the combination of functions corresponding to the switch elements 31A, 31B, 31C, and 31D, to the combination of functions corresponding to the switch elements 31A, 31B, 31E, and 31F.

Sixth Modified Example

Figure 12:
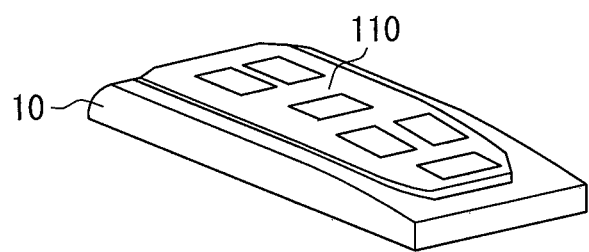
FIG. 12 is a view showing a member in which an upper case and a top plate are integrally formed.

The above describes a configuration which treats the upper case 10 and the top plate 110 as separate members. There is no need to be limited thereto. As shown in FIG. 12, the upper case 10 and the top plate 110 may be integrally formed.

Although the present disclosure is described based on the above embodiment, the present disclosure is not limited to the embodiment and the structure. The present disclosure is intended to cover various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. A portable device that executes wireless communication with an in-vehicle device in a vehicle to at least cause the in-vehicle device to perform control relating to locking or unlocking of a door in the vehicle, the portable device comprising:
    a circuit board on which a function that executes a control is mounted;
    a housing provided by combining an upper case and a lower case, which are to be separate from each other in an up and down direction that is orthogonal to the circuit board, the housing is formed to have a shape viewed from an upper position, the shape being a rectangle including a long side in a long side direction and a short side in a short side direction with rounded corner portions;
    a side cover attached to a side surface on an outside of the housing to bring the upper case and the lower case into close contact with each other;
    an emergency key that performs mechanically locking or unlocking of the door in the vehicle, the emergency key comprising (i) a key plate portion inserted into a keyhole provided in the vehicle and (ii) a key grip portion to be gripped by a user; and
    a key holding mechanism holding detachably the emergency key, the key holding mechanism including a key accommodating portion formed along the long side direction of the housing to accommodate the key plate portion;
wherein:
the side cover includes a side cap that is attached to an attachment end portion that is a one end portion of both end portions in the long side direction of the housing, the attachment end portion where the key grip portion of the emergency key is located in a state where the emergency key is inserted to the key holding mechanism,
    the side cap being a member that bundles the upper case and the lower case and is detachable from the attachment end portion of the housing by being slid in the long side direction of the housing; and
in the state where the emergency key is inserted to the key holding mechanism, the side cap is configured to be fixed in between the housing and the key grip portion of the emergency key so as not to be slid in the long side direction of the housing by the key grip portion.

2. The portable device according to claim 1, wherein:
the side cover includes a pair of side bands, respectively, attached to both side surfaces in the long side direction of the housing so as to sandwich the housing from both end portions in the short side direction of the housing; and
each of the side bands has a cross-sectional shape being a U-shape in a direction orthogonal to the long side direction of the housing so as to sandwich the upper case and the lower case.

3. The portable device according to claim 1, wherein:
the upper case and the lower case are combined with each other so as to provide a predetermined falling-proof performance and waterproof performance; and
the side cover is used as a member that provides a predetermined industrial design.

4. The portable device according to claim 3, wherein:
the lower case has a lower surface to which a bottom plate serving as a member that provides a predetermined industrial design is attached; and
the upper case has an upper surface to which a top plate serving as a member that provides a predetermined industrial design is attached.

* * * * *